(12) United States Patent
Kim et al.

(10) Patent No.: US 10,347,941 B2
(45) Date of Patent: Jul. 9, 2019

(54) LITHIUM METAL BATTERY

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Youngsoo Kim, Suwon-si (KR); Seoksoo Lee, Yongin-si (KR); Taehwan Yu, Seongnam-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 273 days.

(21) Appl. No.: 15/398,132

(22) Filed: Jan. 4, 2017

(65) Prior Publication Data
US 2017/0331152 A1    Nov. 16, 2017

(30) Foreign Application Priority Data
May 11, 2016  (KR) .................. 10-2016-0057810

(51) Int. Cl.
| | |
|---|---|
| H01M 10/0567 | (2010.01) |
| H01M 4/134 | (2010.01) |
| H01M 4/38 | (2006.01) |
| H01M 10/0525 | (2010.01) |
| H01M 10/0568 | (2010.01) |
| H01M 10/0569 | (2010.01) |

(52) U.S. Cl.
CPC ....... *H01M 10/0567* (2013.01); *H01M 4/134* (2013.01); *H01M 4/382* (2013.01); *H01M 10/0525* (2013.01); *H01M 10/0568* (2013.01); *H01M 10/0569* (2013.01); *H01M 2300/0025* (2013.01)

(58) Field of Classification Search
CPC ......... H01M 10/0567; H01M 10/0568; H01M 10/0569; H01M 10/0525; H01M 4/134; H01M 4/382; H01M 2300/0025
See application file for complete search history.

(56) References Cited

U.S. PATENT DOCUMENTS

| | | |
|---|---|---|
| 7,745,052 B2 | 6/2010 | Paulsen |
| 2002/0172859 A1 | 11/2002 | Roh et al. |
| 2009/0280405 A1 | 11/2009 | Sannier et al. |
| (Continued) | | |

FOREIGN PATENT DOCUMENTS

| | | |
|---|---|---|
| JP | 1998334730 A | 12/1998 |
| JP | 2001229966 A | 2/2001 |
| JP | 2013097908 A | 5/2013 |
| (Continued) | | |

OTHER PUBLICATIONS

Qian et al., "High rate and stable cycling of lithium metal anode", Nature Communications, 2015, pp. 1-9.

*Primary Examiner* — Laura Weiner
(74) *Attorney, Agent, or Firm* — Cantor Colburn LLP

(57) ABSTRACT

A lithium metal battery includes a lithium metal negative electrode; a positive electrode; and an electrolyte between the lithium metal negative electrode and the positive electrode, wherein the electrolyte includes a nonaqueous organic solvent, a lithium salt, and an inorganic additive, wherein the inorganic additive includes an inorganic oxide, and wherein the inorganic oxide includes at least one selected from a hydroxyl group and a $C_1$-$C_{10}$ alkyl group attached to a surface of the inorganic oxide.

26 Claims, 13 Drawing Sheets

(56) References Cited

U.S. PATENT DOCUMENTS

2015/0349365 A1   12/2015   Lee et al.

FOREIGN PATENT DOCUMENTS

| JP | 5372748 B2 | 9/2013 |
| KR | 1020020087758 A | 11/2002 |
| KR | 100754421 B1 | 8/2007 |
| KR | 1020090019892 A | 2/2009 |
| KR | 1020150136446 A | 12/2015 |

LITHIUM METAL BATTERY

CROSS-REFERENCE TO RELATED APPLICATION

This application claims the benefit of and priority to Korean Patent Application No. 10-2016-0057810, filed on May 11, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a lithium metal battery, and more particularly, to a lithium metal battery that includes a lithium metal negative electrode.

2. Description of the Related Art

In recent years, portable electronic devices, such as mobile phones, camcorders, and laptops, have been developed, driving a demand for miniaturized portable electronic devices and making portable electronic devices lightweight. Correspondingly, there is demand for improvement of lithium secondary batteries, which are used as power sources of portable electronic devices, in terms of their characteristics, such as high capacity, long lifespan, and high stability. In addition, there has been a growing interest in the electrification of vehicles, and lithium secondary batteries have emerged as a powerful alternative as power sources of electric vehicles.

As a means to improve cycle characteristics and durability, and to provide a large-capacity lithium secondary battery, research has considered battery constituents, such as positive active materials or negative active materials, to improve the electrochemical properties thereof.

Particularly, among the active materials currently used for lithium secondary batteries, lithium metal has been attracting attention as a material for high capacity batteries due to its large electrical capacity per unit mass. However, lithium metal has drawbacks in that, when lithium ions are attached and detached, a dendrite may be form, which may cause an electrical short between a positive electrode and a negative electrode. Further, due to its high reactivity, lithium metal may cause side reactions with an electrolyte, reducing lifespan characteristics.

In a lithium battery, for example, in a secondary battery including lithium metal, repeated charging and discharging may cause the loss of lithium metal due to dendrite formation on a lithium metal surface and reductive decomposition of an electrolyte. Particularly, when a battery is charged, decomposition of a nonaqueous organic solvent and decomposition of a lithium salt of the electrolyte may occur. Such decomposition of the electrolyte may accelerate changes in composition of the electrolyte and dendrite growth on lithium metal, which may lead to a decrease of charging and discharging efficiency and undesirable cycle characteristics.

Accordingly, there remains a need for improved battery materials.

SUMMARY

Provided is a lithium metal battery that includes a lithium metal negative electrode and an electrolyte containing an inorganic additive.

Additional aspects will be set forth in part in the description which follows and, in part, will be apparent from the description.

According to an aspect of an embodiment, a lithium metal battery includes a lithium metal negative electrode; a positive electrode; and an electrolyte between the lithium metal negative electrode and the positive electrode, wherein the electrolyte includes a nonaqueous organic solvent, a lithium salt, and an inorganic additive, wherein the inorganic additive includes an inorganic oxide, and wherein the inorganic oxide includes at least one selected from a hydroxyl group and a $C_1$-$C_{10}$ alkyl group attached to a surface of the inorganic oxide.

The nonaqueous organic solvent may include at least one selected from a glyme solvent and an ether solvent.

The glyme solvent may include at least one selected from 1,2-dimethoxyethane, diethylene glycol dimethyl ether, diethylene glycol diethyl ether, dimethylene glycol dimethyl ether, trimethylene glycol dimethyl ether, tetraethylene glycol dimethyl ether, polyethylene glycol dimethyl ether, triethylene glycol dimethyl ether, and triethylene glycol diethyl ether.

The ether solvent may include at least one selected from 1,1,2,2-tetrafluoroethyl-2,2,3,3-tetrafluoropropyl ether (TTE), tetrahydrofuran, 2-methyltetrahydrofuran, dimethyl ether, and dibutyl ether.

The lithium salt may include at least one selected from lithium bis(fluorosulfonyl) imide (LiFSI), lithium bis(trifluoromethanesulfonyl) imide (LiTFSI), $LiPF_6$, $LiBF_4$, $LiAsF_6$, $LiClO_4$, $LiCsPF_6$, $LiNO_3$, $LiPO_2F_2$, LiBr, lithium bis(oxalato)borate (LiBOB), lithium difluoro(oxalate)borate (LiDfOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and lithium trifluoromethanesulfonate (LiTFS).

The lithium salt may be present as a solute dissolved in the nonaqueous organic solvent, and the inorganic additive may be insoluble in the nonaqueous organic solvent.

The inorganic additive may have attractive interactions with at least one selected from the nonaqueous organic solvent and the lithium salt.

The attractive interactions include at least one selected from intermolecular forces, electrostatic interactions, π-interactions, Van der Waals forces, hydrogen bonds, and anion absorption.

The inorganic oxide may include at least one selected from a compound represented by Formula 1 and a complex thereof:

$$M_xO_y \qquad \text{Formula 1}$$

wherein, in Formula 1, 1≤x≤2 and 1≤y≤4 and M may include at least one selected from silicon, aluminum, magnesium, titanium, zirconium, zinc, and barium.

The inorganic oxide may include at least one selected from $SiO_2$, $TiO_2$, ZnO, $Al_2O_3$, $BaTiO_3$, and a complex thereof.

The amount of the inorganic additive may be in a range of about 0.1 parts by weight to about 20 parts by weight, based on 100 parts by weight of a total weight of the nonaqueous organic solvent and the lithium salt.

The inorganic additive may be in particle form and include primary particles having an average particle diameter of about 5 nanometers (nm) to about 100 nm or agglomerates of the primary particles having an average particle diameter of about 1 micrometer to about 100 micrometers.

The lithium metal battery may further include a protective film on the lithium metal negative electrode, wherein the protective film may include a portion of the inorganic additive and a lithium metal layer surrounding the portion of the inorganic additive.

The thickness of the protective film may be in a range of about 1 micrometer to about 100 micrometers.

The lithium metal battery may include at least one selected from a separator and a solid electrolyte disposed between the lithium metal negative electrode and the positive electrode.

According to an aspect, an electrolyte for a lithium metal battery includes a nonaqueous organic solvent; a lithium salt; and an inorganic additive, wherein the inorganic additive includes an inorganic oxide, and the inorganic oxide includes at least one selected from a hydroxyl group and a $C_1$-$C_{10}$ alkyl group attached to a surface of the inorganic oxide.

According to an aspect, a method for producing a lithium metal battery includes providing an electrolyte including a nonaqueous organic solvent, a lithium salt, and an inorganic additive; and combining a lithium metal negative electrode, a positive electrode, and the electrolyte to form the lithium metal battery, wherein the inorganic additive includes an inorganic oxide, and the inorganic oxide includes at least one selected from a hydroxyl group and a $C_1$-$C_{10}$ alkyl group attached to a surface of the inorganic oxide.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
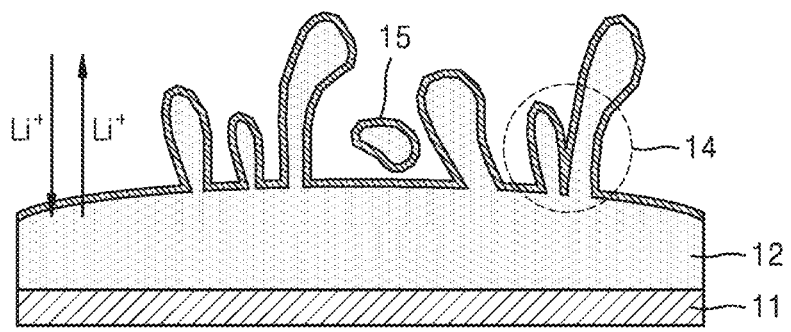
FIG. 1 is a schematic diagram showing an electrolyte contained in a lithium metal battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "alkyl" group used herein refers to a group derived from a fully saturated and branched or unbranched (or a straight or linear) hydrocarbon group. Non-limiting examples of "alkyl" include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

At least one hydrogen atom of the alkyl group may be substituted with a halogen atom, a $C_1$-$C_{10}$ alkyl group substituted with a halogen atom (e.g., $CCF_3$, $CHCF_2$, $CH_2F$, and $CCl_3$), a $C_1$-$C_{10}$ alkoxy group, a $C_2$-$C_{10}$ alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a $C_1$-$C_{10}$ alkyl group, a $C_2$-$C_{10}$ alkenyl group, a $C_2$-$C_{10}$ alkynyl group, a $C_1$-$C_{10}$ heteroalkyl group, a $C_6$-$C_{10}$ aryl group, a $C_6$-$C_{10}$ arylalkyl group, a $C_6$-$C_{10}$ heteroaryl group, a $C_7$-$C_{10}$ heteroarylalkyl group, a $C_6$-$C_{10}$ heteroaryloxy group, a $C_6$-$C_{10}$ heteroaryloxyalkyl group, or a $C_6$-$C_{10}$ heteroarylalkyl group.

The term "halogen atom" as used herein refers to fluorine, bromine, chlorine, or iodine.

The term "alkenyl" group as used herein refers to a group derived from a branched or unbranched hydrocarbon with at least one carbon-carbon double bond. Non-limiting examples of the alkenyl group include vinyl, aryl, butenyl, isopropenyl, and isobutenyl. At least one hydrogen atom of the alkenyl group may be substituted with the same substituents as described with respect to the alkyl group.

The term "alkynyl" group as used herein refers to a group derived from a branched or unbranched hydrocarbon with at least one carbon-carbon triple bond. Non-limiting examples of the alkynyl group include ethynyl, butynyl, iso-butynyl, and iso-propynyl. At least one hydrogen atom of the alkynyl group may be substituted with the same substituents as described with respect to the alkyl group.

The term "aryl" group as used herein is construed as including a group with an aromatic ring fused to at least one carbon ring. Non-limiting examples of the aryl group include phenyl, naphthyl, and tetrahydronaphthyl.

At least one hydrogen atom of the "aryl" group may be substituted with the same substituents as described with respect to the alkyl group.

The term "heteroaryl" as used herein refers to a monocyclic or bicyclic organic compound including at least one heteroatom selected from nitrogen (N), oxygen (O), phosphorous (P), and sulfur (S), wherein the rest of the cyclic atoms are all carbon atoms. The heteroaryl group may include, for example, one to five heteroatoms. In some embodiments, the heteroaryl group may include a five to ten ring member. In the heteroaryl group, S or N may be oxidized to have various oxidation states.

Non-limiting examples of the heteroaryl group include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyridyl-2-yl, pyridyl-3-yl, 2-pyrazine-2-yl, pyrazine-4-yl, pyrazine-5-yl, 2-pyrimidine-2-yl, 4-pyrimidine-2-yl, and 5-pyrimidine-2-yl.

The term "carbocyclic" as used herein refers to saturated or partially unsaturated non-aromatic monocyclic, bicyclic or tricyclic hydrocarbon groups. Non-limiting examples of the monocyclic hydrocarbon groups include cyclopentyl, cyclopentenyl, cyclohexyl, and cyclohexenyl. Non-limiting examples of the bicyclic hydrocarbon groups include bornyl, decahydronaphthyl, bicyclo[2.1.1]hexyl, bicyclo[2.2.1]heptyl, bicyclo[2.2.1]heptenyl, and bicyclo[2.2.2]octyl. The tricyclic hydrocarbon groups may be, for example, adamantyl and the like.

The term "heterocyclic" as used herein refers to a cyclic hydrocarbon group having at least one heteroatom and 5 to 20 carbon atoms, for example, 5 to 10 carbon atoms. In this regard, the heteroatom may be one selected from sulfur, nitrogen, oxygen, and boron.

As used herein, a Crate is a measure of the rate at which a battery is charged/discharged relative to its maximum capacity. A 1 C rate, or a constant current of 1 C, means that the charge/discharge current will charge/discharge the entire battery in 1 hour.

In a lithium metal battery lithium metal is used as a negative active material, whereas, in a lithium ion battery, an intercalation compound, e.g., graphite, is used as a negative active material. An electrolyte suitable for use in a lithium metal battery may have low reactivity with lithium metal and may not cause the lithium metal to corrode. On the other hand, an electrolyte suitable for use in a lithium ion battery may react with a non-lithium negative active material to form a solid-electrolyte interphase (SEI) layer. The SEI layer may serve positively to control thermodynamic chemical reactions that occur in a lithium ion battery. As is further described above, the properties desirable for an electrolyte suitable for use in a lithium metal battery may be different from those desirable for an electrolyte suitable for use in a lithium ion battery, thus considerations for an electrolyte for a lithium metal battery and an electrolyte a lithium ion battery may be distinct.

Hereinafter, a lithium metal battery, according to an embodiment, will be described in further detail.

The lithium metal battery, according to an embodiment, may include a lithium metal negative electrode, a positive electrode, and an electrolyte.

The lithium metal negative electrode may have a large electric capacity per unit weight, and thus, when the lithium metal negative electrode is used, a battery with a large capacity may be realized. In the case of a lithium metal battery including an electrolyte that includes a carbonate-based organic solvent, during deposition and dissolution of the lithium ions, a dendrite may be formed and grow on the lithium metal negative electrode, causing an electrical short between a positive electrode and a negative electrode. Furthermore, since the lithium metal negative electrode is highly reactive with an electrolyte including a carbonate-based organic solvent, a side-reaction between the lithium metal negative electrode and the electrolyte may occur, which may lead to a decrease of the cycle lifespan of a battery. Accordingly, the lithium metal battery, according to an embodiment, preferably does not include an electrolyte containing a carbonate-based organic solvent.

FIG. 1 is a schematic diagram illustrating an electrolyte (e.g., a carbonate-based electrolyte) contained in a lithium metal battery.

Referring to FIG. 1, a negative electrode current collector 11 and a lithium metal negative electrode 12 are sequentially stacked in this stated order. Due to repeated charging and discharging, a dendrite 14 may be formed and grow on a surface of the lithium metal negative electrode 12, and further, dead lithium 15, e.g., lithium which is disconnected from the negative electrode 12, may also be formed, causing loss of lithium from the lithium metal negative electrode 12. The dendrite 14 may penetrate a separator (not shown) and reach and contact with a positive electrode (not shown), resulting in an electrical short. In addition, the dendrite 14 may increase interfacial resistance between an electrolyte and the lithium metal negative electrode 12. The dead lithium 15 may not be involved in charging and discharging, which may lead to a decrease of charge capacity and discharge capacity. Consequentially, a carbonate-based electrolyte included in a lithium metal battery may increase the irreversibility of a battery and reduce the capacity of a battery, causing a decrease of charging and discharging cycle characteristics.

Hereinafter, an electrolyte used in a lithium metal battery, according to an embodiment, will be described in further detail.

The electrolyte may include a nonaqueous organic solvent, a lithium salt, and an inorganic additive.

The nonaqueous organic solvent may have low reactivity with a lithium metal negative electrode, thus improving battery characteristics. Specifically, the nonaqueous organic solvent may suppress or prevent the loss of lithium caused by the formation and growth of a dendrite on a surface of the lithium metal negative electrode, and suppress decomposition of the electrolyte. Accordingly, the nonaqueous organic solvent may suppress changes to the composition of the electrolyte and the growth of dendrite on the lithium metal negative electrode, thus improving the charging and discharging efficiency and cycle characteristics of a battery.

The nonaqueous organic solvent may comprise at least one selected from a glyme solvent, and an ether solvent.

The glyme solvent may comprise at least one selected from 1,2-dimethoxyethane, diethylene glycol dimethyl ether, diethylene glycol diethyl ether, dimethylene glycol dimethyl ether, trimethylene glycol dimethyl ether, tetraethylene glycol dimethyl ether, polyethylene glycol dimethyl ether, triethylene glycol dimethyl ether, and triethylene glycol diethyl ether.

The ether solvent may comprise at least one selected from 1,1,2,2-tetrafluoroethyl-2,2,3,3-tetrafluoropropyl ether (TTE), tetrahydrofuran, 2-methyltetrahydrofuran, dimethyl ether, and dibutyl ether.

The lithium salt may comprise at least one selected from lithium bis(fluorosulfonyl) imide (LiFSI), lithium bis(trifluoromethanesulfonyl) imide (LiTFSI), $LiPF_6$, $LiBF_4$, $LiAsF_6$, $LiClO_4$, $LiCsPF_6$, $LiNO_3$, $LiPO_2F_2$, LiBr, lithium bis(oxalato)borate (LiBOB), lithium difluoro(oxalate)borate (LiDfOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and lithium trifluoromethanesulfonate (LiTFS).

The lithium salt may be present as a solute dissolved in the nonaqueous organic solvent.

The inorganic additive may include an inorganic oxide and at least one selected from a hydroxyl group (—OH) and a $C_1$-$C_{10}$ alkyl group attached to a surface of the inorganic oxide.

The inorganic additive may be prepared by performing a chemical substitution on a halogen-based inorganic material (e.g., $SiCl_4$) that does not include a hydroxyl group (—OH) or a $C_1$-$C_{10}$ alkyl group on a surface thereof. The chemical substitution may be provided by, for example, flame hydrolysis.

The inorganic additive may be insoluble in the nonaqueous organic solvent.

The inorganic additive may have an attractive interaction with at least one selected from the nonaqueous organic solvent and the lithium salt.

The attractive interaction may comprise at least one selected from intermolecular forces, electrostatic interactions, π-interactions, Van der Waals forces, hydrogen bonds, and anion absorption.

Without being bound by theory, because of the attractive interaction, the inorganic additive may provide an electrolyte including the inorganic additive with anodic stability, and suppress or stop the dendrite growth on a surface of the lithium metal negative electrode. The term "anodic stability" as used herein refers to a characteristic that allows an electrolyte to maintain its stability without causing decomposition thereof at a high voltage (for example, at a charge voltage ranging from about 4 volts (V) to about 5.5 V, about 4.1 V to about 5.3 V, or about 4.2 V to about 5.1 V), thus stably transferring lithium ions, even when repeated charging and discharging cycles are used.

Figure 2:
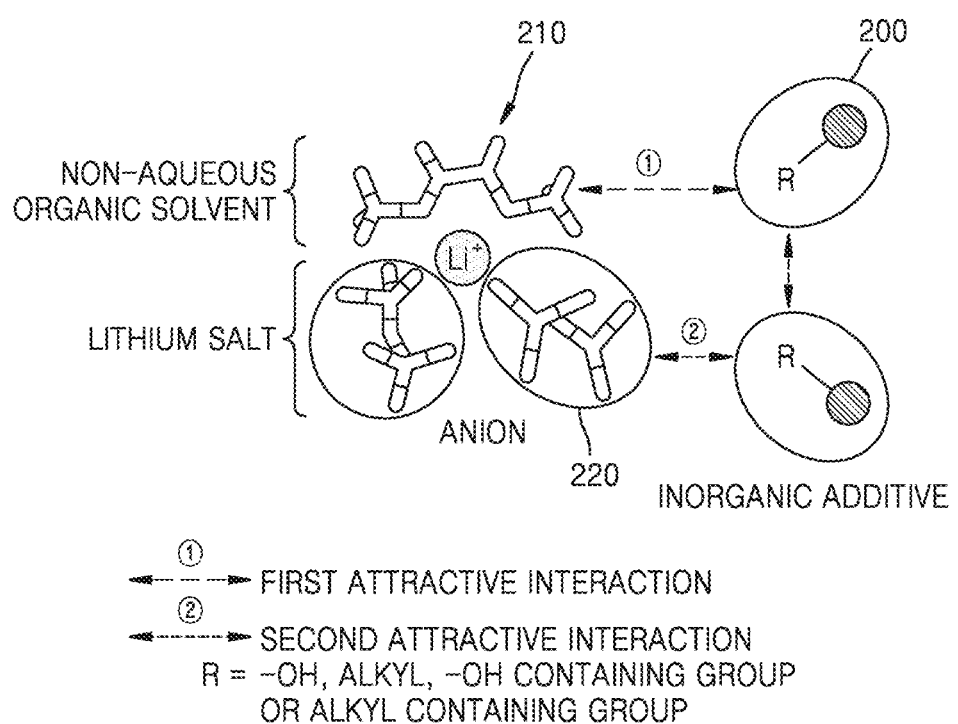
FIG. 2 is a schematic diagram showing the anodic stabilization of an electrolyte for a lithium metal battery according to an embodiment.

FIG. 2 is a schematic diagram illustrating the anodic stabilization characteristics of an electrolyte that is contained in a lithium metal battery according to an embodiment.

Referring to FIG. 2, the inorganic additive 200 may have a first attractive interaction ① with the nonaqueous organic solvent 210 and have a second attractive interaction ② with an anion 220 of the lithium salt. For example, the first attractive interaction ① may be a hydrogen bond, and the second attractive interaction ② may be anion absorption.

Due to the attractive interaction, the electrolyte may have an improved resistance against decomposition at a high voltage, and thus may have improved anodic stability. Accordingly, even when a lithium metal battery including the electrolyte undergoes repeated charging and discharging, the electrolyte may stably transfer lithium ions.

The inorganic additive may be in particle form.

The inorganic additive may include primary particles having an average particle diameter of about 5 nanometers (nm) to about 100 nm, about 10 nm to about 90 nm, or about 20 nm to about 80 nm, or agglomerates of the primary particles having an average particle diameter of about 1 micrometer (μm) to about 100 μm, about 2 μm to about 80 μm, or about 4 μm to about 60 μm. When the average particle diameter of the inorganic additive is within this range, the inorganic additive may not hinder the migration of lithium ions in the electrolyte.

The lithium metal battery may further include a protective film on the lithium metal negative electrode. The protective film may prevent formation and growth of a dendrite on a surface of the lithium metal negative electrode and thus may reduce an interfacial resistance between the lithium metal negative electrode and the electrolyte, thus allowing lithium ions to migrate more effectively.

The protective film may include a portion of the inorganic additive and a lithium metal layer surrounding the portion of inorganic additive. Specifically, the protective film may include the inorganic additive in particle form dispersed on a surface of the lithium metal negative electrode and a lithium metal layer surrounding the inorganic additive.

The thickness of the protective film may be in a range of about 1 μm to about 100 μm. When the thickness of the protective film is within this range, migration of lithium ions may be improved.

Figure 3:
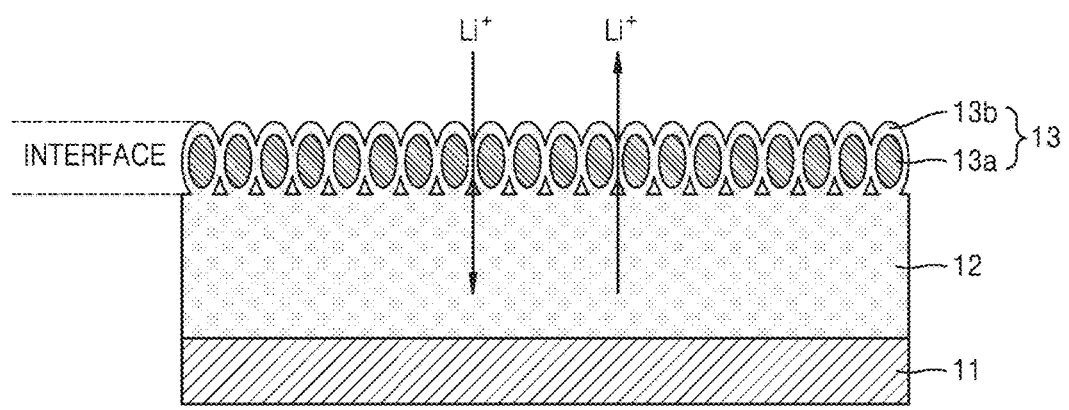
FIG. 3 is a schematic diagram showing dendrite growth suppression of an electrolyte for a lithium metal battery according to an embodiment.

FIG. 3 is a schematic diagram showing the dendrite growth suppression effect of an electrolyte in a lithium metal battery according to an embodiment;

Referring to FIG. 3, a negative electrode current collector 11, a lithium metal negative electrode 12, and a protective film 13 are stacked sequentially in this stated order.

The protective film 13 may include an inorganic additive 13a in particle form and a lithium metal layer 13b. Due to the inorganic additive 13a in particle form, which is dispersed on a surface of the lithium metal negative electrode 12. Lithium ions (Li$^+$) desorbed from the lithium metal negative electrode 12 may inevitably pass through the gaps between the adjacent inorganic additives 13a, and in addition, due to the particle structure of the inorganic additive 13a, formation and growth of the dendrite may be fundamentally suppressed.

The inorganic oxide may include at least one selected from a compound represented by Formula 1 and a complex thereof:

$$M_xO_y \quad \text{Formula 1}$$

wherein, in Formula 1, $1 \leq x \leq 2$ and $1 \leq y \leq 4$ and M may comprise at least one selected from silicon (Si), aluminum (Al), magnesium (Mg), titanium (Ti), zirconium (Zr), zinc (Zn), and barium (Ba).

The inorganic oxide may include at least one selected from $SiO_2$, $TiO_2$, ZnO, $Al_2O_3$, $BaTiO_3$, and a complex thereof. The term "complex" as used herein refers to a material formed by doping a compound into another compound.

The amount of the inorganic additive 13a may be in a range of about 0.1 parts by weight to about 20 parts by weight, about 0.5 parts by weight to about 15 parts by weight, or about 1 part by weight to about 10 parts by weight, based on 100 parts by weight of the total weight of the nonaqueous organic solvent and the lithium salt. When the amount of the inorganic additive 13a is within this range, the performance of the electrolyte may be maintained during repeated charging and discharging.

The lithium metal negative electrode 12 may be on a negative electrode current collector 11.

The thickness of the negative electrode current collector 11 may be in a range of about 3 μm to about 500 μm, about 6 μm to about 450 μm, or about 9 μm to about 400 μm. A material for the negative electrode current collector 11 is not particularly limited as long as the material has suitable electrical conductivity while not causing an undesirable chemical change in the lithium metal battery including the negative electrode current collector 11. Examples of the material for the negative electrode current collector 11 may include at least one selected from copper, stainless steel, aluminum, nickel, titanium, heat-treated carbon, copper or stainless steel that is surface-treated with carbon, nickel, titanium, or silver, and an aluminum-cadmium alloy. In addition, the negative electrode current collector 11 may be processed to have a fine structure, e.g., raggednesses or a modulation, on a surface thereof to enhance a binding force of the lithium metal negative electrode 12 to the negative electrode current collector 11. The negative electrode current collector 11 may be used in any suitable form including as films, sheets, foils, nets, porous structures, foams, and non-woven fabrics.

The positive electrode may include a lithium transition metal oxide, a binder, and a conductive agent.

The lithium transition metal oxide may include at least one selected from $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, and $a+b+c=1$), $LiNi_{1-y}Co_yO_2$, $LiCo_{1-y}Mn_yO_2$, $LiNi_{1-y}Mn_yO_2$ (wherein $0 \leq y<1$), $LiMn_{2-z}Ni_zO_4$, $LiMn_{2-z}Co_zO_4$ (wherein $0<z<2$), $LiCoPO_4$, and $LiFePO_4$.

The binder may facilitate binding between components, such as the lithium transition metal oxide and the conductive agent, and facilitate binding of a positive electrode to a positive electrode current collector. Examples of the binder may include at least one selected from a polyacrylic acid (PAA), a polyvinylidene difluoride, a polyvinyl alcohol, a carboxymethyl cellulose (CMC), a starch, a hydroxypropyl cellulose, a regenerated cellulose, a polyvinylpyrrolidone, tetrafluoroethylene, a polyethylene, a polypropylene, an ethylene-propylene-diene monomer (EPDM), a sulfonated EPDM, a styrene-butadiene-rubber, a fluorinated rubber, a copolymer thereof, and a polyester.

The amount of the binder may be about 1 part by weight to about 20 parts by weight, for example, about 2 parts by weight to about 7 parts by weight, based on 100 parts by weight of the total weight of the lithium transition metal oxide. When the amount of the binder is within this range (about 1 part by weight to about 20 parts by weight), a binding force of a positive electrode to a positive electrode current collector may be desirably enhanced.

The conductive agent is not particularly limited as long as the conductive agent is electrically conductive and does not induce an undesirable chemical change in the lithium metal battery including the conductive agent.

Examples of the conductive agent may include at least one carbonaceous conductive agent selected from carbon black, carbon fiber, and graphite. The carbon black may include, for example, at least one selected from acetylene black, Ketjen black, Super P carbon, channel black, furnace black, lamp black, and thermal black. Examples of the graphite may include at least one selected from natural graphite and artificial graphite.

The positive electrode may additionally include an additional conductive agent in addition to the carbonaceous conductive agent described above.

The additional conductive agent may include at least one selected from an electrically conductive fiber, e.g., a metal fiber, a fluorocarbon powder, and a metal powder, e.g., aluminum powder or nickel powder; an electrically conductive whisker, e.g., a zinc oxide or a potassium titanate whisker; and a polyphenylene derivative.

The amount of the conductive agent may be about 0.5 parts by weight to about 10 parts by weight, for example, about 0.01 parts by weight to about 5 parts by weight, based on 100 parts by weight of the total weight of the lithium transition metal oxide. When the amount of the conductive agent is within this range (about 0.5 parts by weight to about 10 parts by weight), the electrical conductivity characteristics of the final positive electrode may be improved.

The positive electrode may be disposed on a positive electrode current collector.

The thickness of the positive electrode current collector may be in a range of about 3 μm to about 500 μm. The positive electrode current collector is not particularly limited as long as the current collector has sufficient electrical conductivity and does not induce an undesirable chemical change in the lithium metal battery including the positive electrode current collector. Examples of the positive electrode current collector may include at least one selected from stainless steel, aluminum, nickel, titanium, heat-treated carbon, and aluminum or stainless steel that is surface-treated with carbon, nickel, titanium, or silver. The positive electrode current collector may be processed to have a fine structure, e.g., raggednesses or modulation, on a surface thereof to enhance a binding force of the positive active material to the positive electrode current collector. The positive electrode current collector may be used in any suitable forms including films, sheets, foils, nets, porous structures, foams, and non-woven fabrics.

A separator may further be disposed between the lithium metal negative electrode and the positive electrode.

The pore diameter of the separator may be in a range of about 0.01 μm to about 10 μm, and the thickness of the separator may be in a range of about 5 μm to about 300 μm. In particular, the separator may include, for example, an olefin-based polymer, such as polypropylene or polyethylene; or a sheet or non-woven fabric formed of glass fibers.

A lithium metal battery, according to another embodiment, may further include an organic solid electrolyte and/or an inorganic solid electrolyte, in addition to the electrolyte. When the lithium metal battery further includes an organic solid electrolyte and/or an inorganic solid electrolyte, either of the solid electrolytes may also serve as a separator if required. Thus, the foregoing separator may be omitted if desired.

Examples of the organic solid electrolyte may include at least one selected from a polyethylene derivative, a polyethylene oxide derivative, a polypropylene oxide derivative, a phosphoric ester polymer, a polyester sulfide, a polyvinyl alcohol, and a polyvinylidene difluoride.

Examples of the inorganic solid electrolyte may include at least one selected from $Li_4SiO_4$, a lithium nitride, a lithium halide, and a lithium sulfide, such as at least one selected from $Li_3N$, $LiI$, $Li_5NI_2$, $Li_3N$—$LiI$—$LiOH$, $Li_2SiS_3$, $Li_4SiO_4$—$LiI$—$LiOH$, and $Li_3PO_4$—$Li_2S$—$SiS_2$.

The lithium metal battery may be a coin type, a rectangular type, a pouch type, or a thin-film type.

Figure 4:
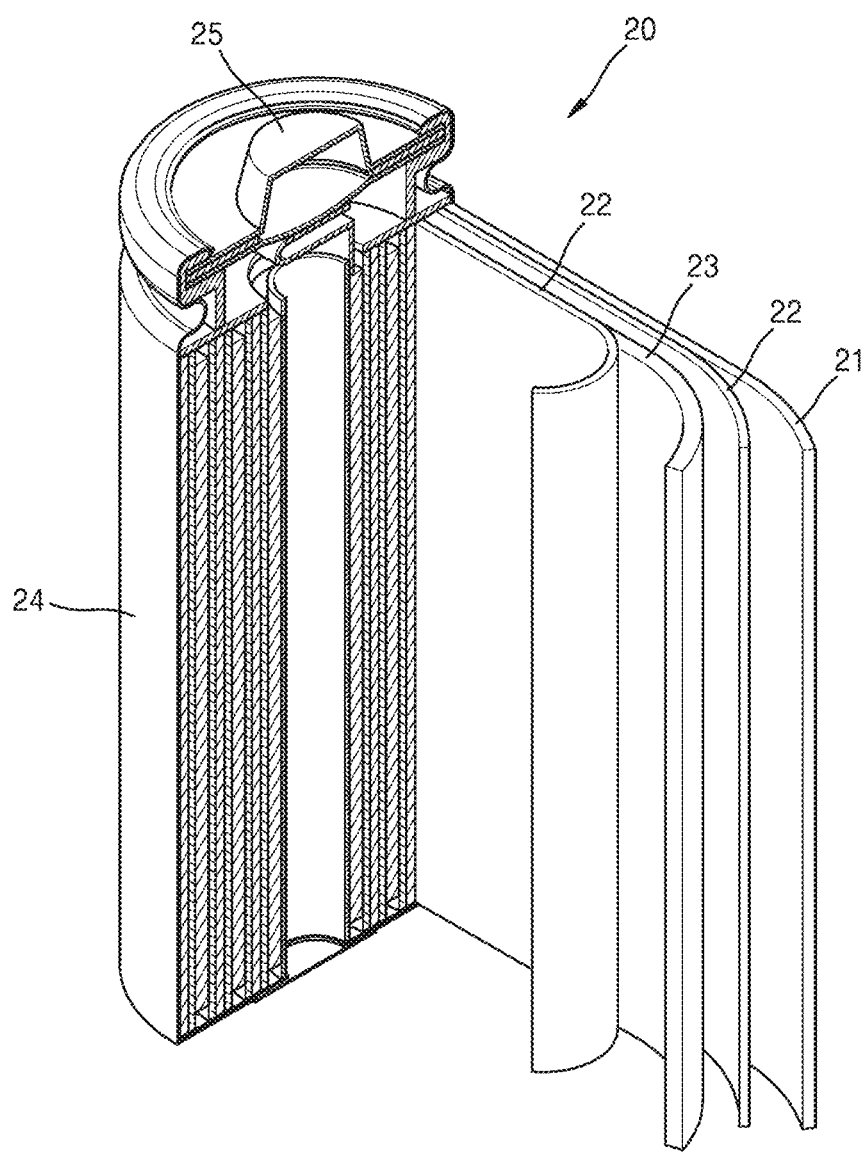
FIG. 4 is a schematic view illustrating an embodiment of a lithium metal battery.

FIG. 4 is a schematic view illustrating an embodiment of a lithium metal battery 20.

Referring to FIG. 4, the lithium metal battery 20 may include a positive electrode 23, a lithium metal negative electrode 21, and a separator 22.

The foregoing lithium metal negative electrode 21, the positive electrode 23, and the separator 22 may be wound or folded to be accommodated in a battery case 24. Subsequently, the foregoing electrolyte (not shown) may be injected to the battery case 24, and a cap assembly 25 may seal the battery case 24, thereby completing the manufacture of the lithium secondary battery 20. The battery case 24 may be a coin type, a rectangular type, a pouch type, or a thin-film type. For example, the lithium metal battery 20 may be a large thin-film type battery.

The lithium metal battery 20 may have improved charging and discharging efficiency and lifespan characteristics.

The lithium metal battery 20 may be used as a power source in a mobile device, e.g., a mobile phone, a personal digital assistant (PDA), and a portable multimedia player (PMP); a power source for driving a motor in a high-output hybrid automobile or an electric vehicle; a power source in a flexible display device, e.g., e-ink, e-paper, a flexible liquid crystal display device (LCD), and a flexible organic light-emitting display device (OLED); and a microbattery as a power source in an integrated circuit device on a printed circuit board (PCB).

The present disclosure will now be described in greater detail with reference to the following examples. However, the following examples are for illustrative purposes only and shall not limit the scope of the present disclosure.

EXAMPLES

Comparative Example 1: Manufacture of Lithium Metal Battery

As for a lithium metal negative electrode, a lithium metal thin film (having a thickness of about 20 μm) was prepared.

$LiCoO_2$, a conductive agent (Super-P; available from Timcal Ltd.), polyvinylidene fluoride (PVdF), and N-pyrrolidone were mixed together to obtain a positive electrode composition. In the positive electrode composition, the weight ratio of the $LiCoO_2$, the conductive agent, and PVdF was about 94:3:3.

The positive electrode composition was coated on an aluminum foil (having a thickness of about 15 μm) and then dried at 25° C., followed by drying the resultant coated foil at a temperature of about 110° C. under vacuum, thereby preparing a positive electrode. The discharge capacity of the positive electrode per unit area was about 3.8 milliampere hours per square centimeter ($mAh/cm^2$).

A polyethylene separator (having a porosity of about 48%) was disposed between the foregoing positive electrode and the lithium metal negative electrode (having a thickness of about 20 μm), thereby completing the manufacture of a lithium metal battery (a pouch cell). Subsequently, an electrolyte was injected between the positive electrode and the lithium metal negative electrode. The electrolyte was 1.0 molar (M) LiN(SO$_2$F)$_2$ (hereinafter, referred as "LiFSI") dissolved in a solvent mixture having a volume ratio of 1,2-dimethoxyethane (DME) to 1,1,2,2-tetrafluoroethyl-2,2,3,3-tetrafluoropropyl ether (TTE) of about 2:8.

Examples 1 to 4: Manufacture of Lithium Metal Battery

Lithium metal batteries were manufactured in the same manner as in Comparative Example 1, except that the inorganic additives shown in Table 1 were further included in the electrolyte.

TABLE 1

| | Inorganic additive | |
|---|---|---|
| | Type | Amount (parts by weight*) |
| Example 1 | SiO$_2$ having —OH groups on a surface thereof (Evonik, OX50) | 0.5 |
| Example 2 | Al$_2$O$_3$ doped SiO$_2$ having —OH groups on a surface thereof (Evonik, MOX170) | 0.5 |
| Example 3 | A mixture of 1 part by weight of Al$_2$O$_3$ and 5 parts by weight of SiO$_2$, the mixture having —OH groups on a surface thereof (Evonik, COK84) | 0.5 |
| Example 4 | SiO$_2$ having —CH$_3$ groups on a surface thereof (Evonik, R202) | 0.5 |
| Example 5 | SiO$_2$ having —Si(CH$_3$)$_3$ groups on a surface thereof (Evonik, RY50) | 0.5 |

*based on 100 parts by weight of the total amount of DME, TTE, and LiFSI.

Evaluation Example 1: Scanning Electron Microscope (SEM) Analysis

Figure 5:
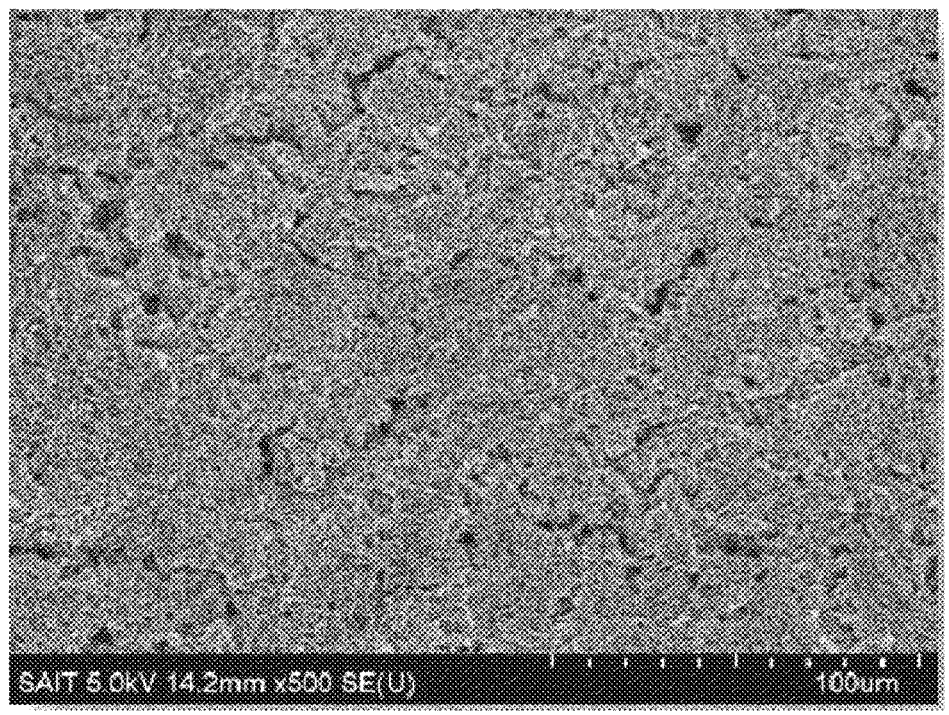
FIG. 5 is a scanning electron microscope (SEM) image of a surface of a lithium metal negative electrode included in a lithium metal battery manufactured in Example 1, as obtained after performing charging and discharging cycles on the lithium metal battery with a constant current of 1 C until the capacity retention reached 60%.
Figure 6:
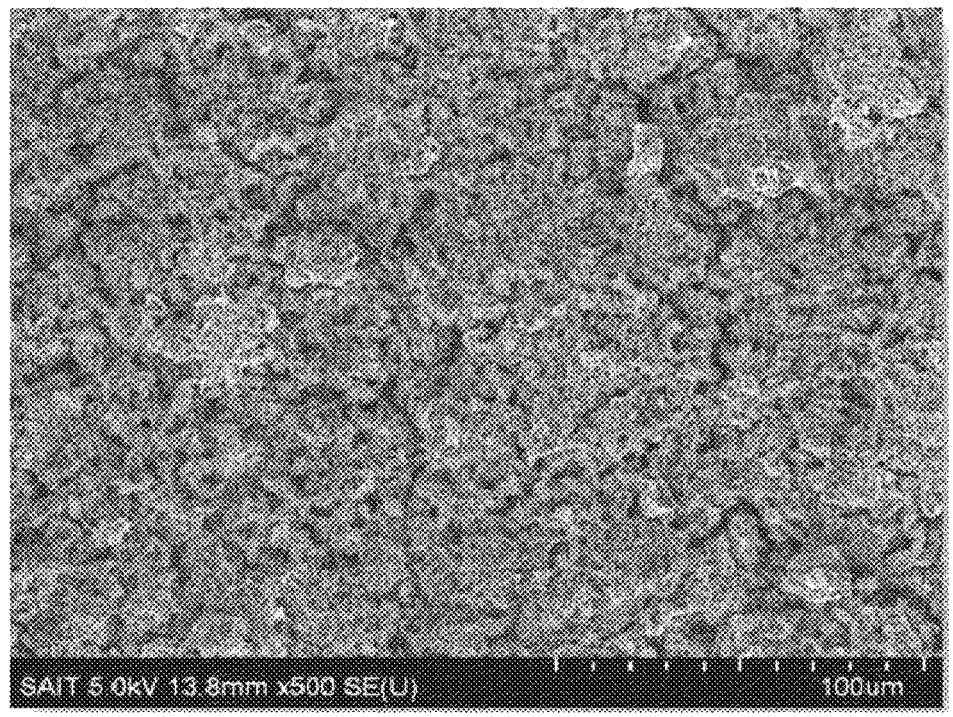
FIG. 6 is an SEM image of a surface of a lithium metal negative electrode included in a lithium metal battery manufactured in Comparative Example 1, obtained after performing charging and discharging cycles on the lithium metal battery with a constant current of 1 C until the capacity retention reached 60%.

The lithium metal batteries manufactured in Example 1 and Comparative Example 1 were charged with a constant current of 1 C (3.8 mA/cm$^2$) to a constant voltage ranging from 4.40 volts (V, vs. Li) to 3.0 V at a temperature of 25° C., and then a constant current discharge cycle evaluation was performed thereon. The structure of a surface of a lithium metal negative electrode was analyzed by using an SEM. The results thereof are shown in FIGS. 5 and 6. FIG. 5 is an image of a surface of a lithium metal negative electrode included in a lithium metal battery of Example 1. FIG. 6 is an image of a surface of a lithium metal negative electrode included in a lithium metal battery of Comparative Example 1.

Referring to FIGS. 5 and 6, it was found that the lithium metal battery of Example 1 had less dendrite formation on a surface thereof than the lithium metal battery of Comparative Example 1.

Evaluation Example 2: Charging and Discharging Characteristics

The lithium metal batteries manufactured in Examples 1 to 4 and Comparative Example 1 were aged for a day at a temperature of 25° C. Subsequently, each of the lithium metal batteries was charged with a constant current of 0.1 C to a voltage of 4.40 V (vs. Li). Then, each of the lithium metal batteries was cut-off at a current of 0.1 C, while maintaining a voltage of 4.40 V in a constant voltage mode. Subsequently, each of the lithium metal batteries was discharged with a constant current of 0.1 C to a voltage of 3.0 V (vs. Li) (the first cycle in the formation process). The entire formation process was completed by repeating the charging and discharging process twice. Then, the lithium metal batteries were allowed to rest.

The lithium metal battery that underwent the formation process was charged with a constant current of 1 C to a voltage ranging from 3.0 V to 4.4 V (vs. Li) at room temperature (25° C.). Then, each of the lithium metal batteries was cut-off at a current of 0.1 C, while maintaining a voltage of 4.40 V in a constant voltage mode. Subsequently, each of the lithium metal batteries was discharged with a constant current of 1 C to a voltage of 3.0 V (vs. Li) (the first cycle). The foregoing charging and discharging process was repeated up to 110 cycles. The capacity retention (%) was calculated based on Equation 1.

$$\text{Capacity retention (\%)} = (n^{th}\text{-cycle discharge capacity}/1^{st}\text{ cycle discharge capacity}) \times 100\% \quad \text{Equation 1}$$

wherein, in Equation 1, n is an integer selected from 2 to 110.

Figure 7:
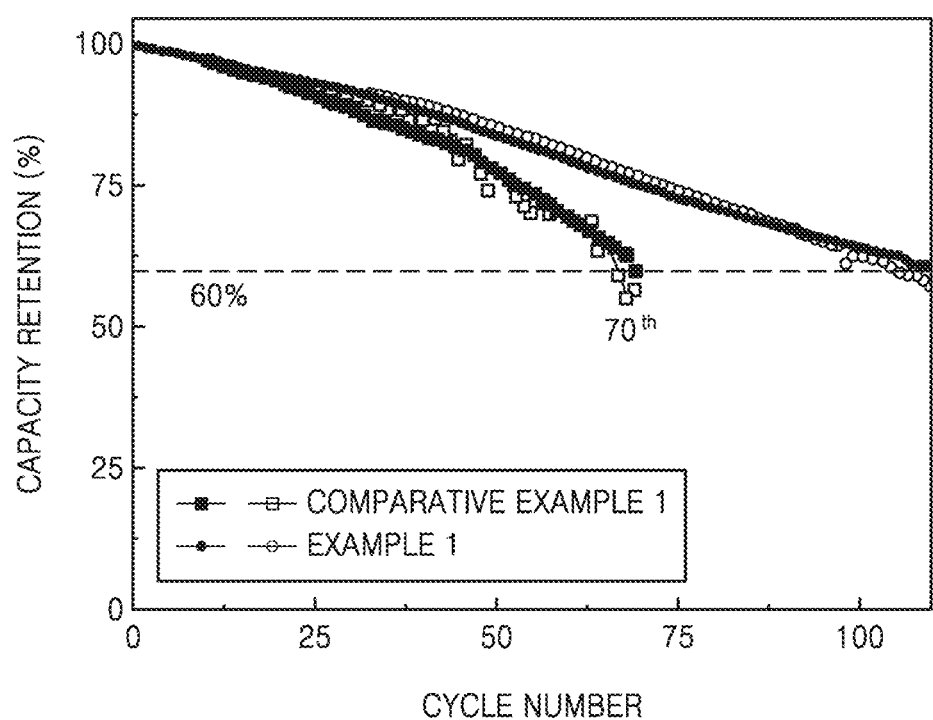
FIG. 7 is a graph of capacity retention (percent, %) versus cycle number illustrating changes to the capacity of the lithium metal batteries of Example 1 and Comparative Example 1.

The changes of capacity retention for the lithium metal batteries of Example 1 and Comparative Example 1 with respect to the number of cycles are shown in FIG. 7.

Referring to FIG. 7, based on a 60% capacity retention, it was found that the lithium metal battery of Comparative Example 1 exhibited about 70 cycles of lifespan characteristics, whereas the lithium metal battery of Example 1 exhibited about 110 cycles of excellent lifespan characteristics.

Figure 8:
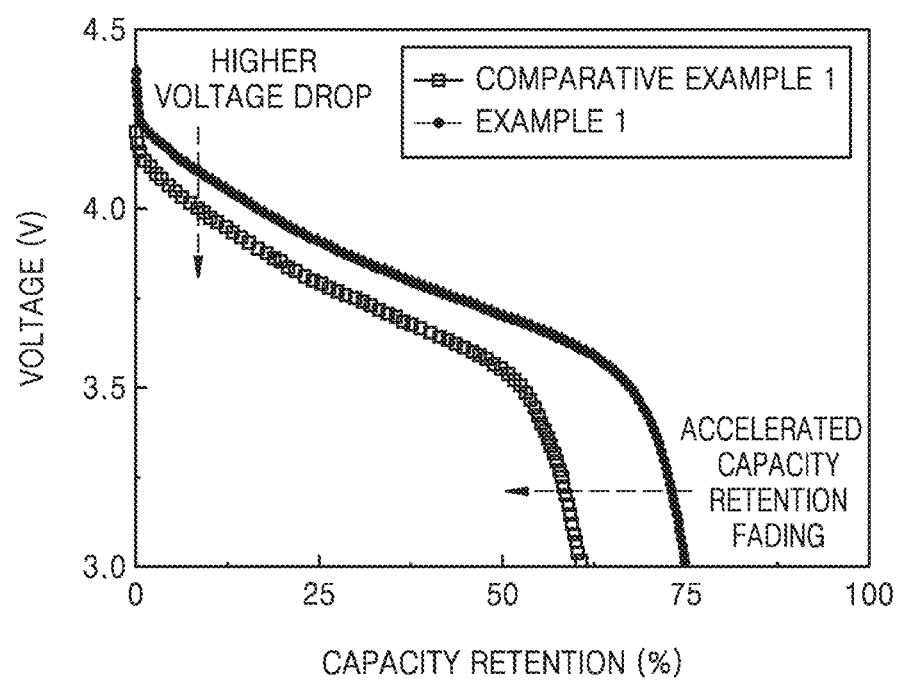
FIG. 8 is a graph of voltage (volts, V) versus capacity retention (%) for the 70$^{th}$ cycle, illustrating discharge characteristics of the lithium metal batteries of Example 1 and Comparative Example 1.

The discharge characteristics of the lithium metal batteries of Example 1 and Comparative Example 1 at the 70$^{th}$ cycle is shown in FIG. 8.

Referring to FIG. 8, it was found that the lithium metal battery of Comparative Example 1 had a great decrease in voltage due to the internal resistance and an accelerated decrease in capacity retention, as compared with the lithium metal battery of Example 1. Accordingly, the lithium metal battery of Example 1 was found to exhibit excellent electrochemical performance, as compared with the lithium metal battery of Comparative Example 1.

Figure 9:
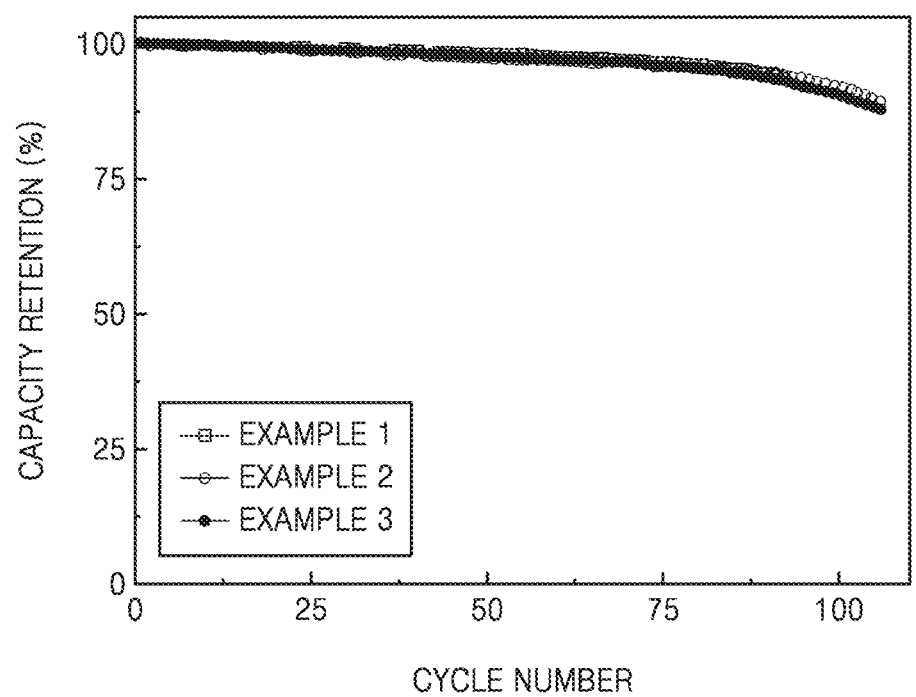
FIG. 9 is a graph of capacity retention (%) versus cycle number illustrating changes in the capacity of the lithium metal batteries of Examples 1 to 3 with respect to the number of cycles.

The changes of capacity retention of the lithium metal batteries of Examples 1 to 3 with respect to the number of cycles are shown in FIG. 9.

Referring to FIG. 9, similar to one another, the lithium metal batteries manufactured in Examples 1 to 3 were all found to have excellent cycle lifespan performance.

Figure 10:
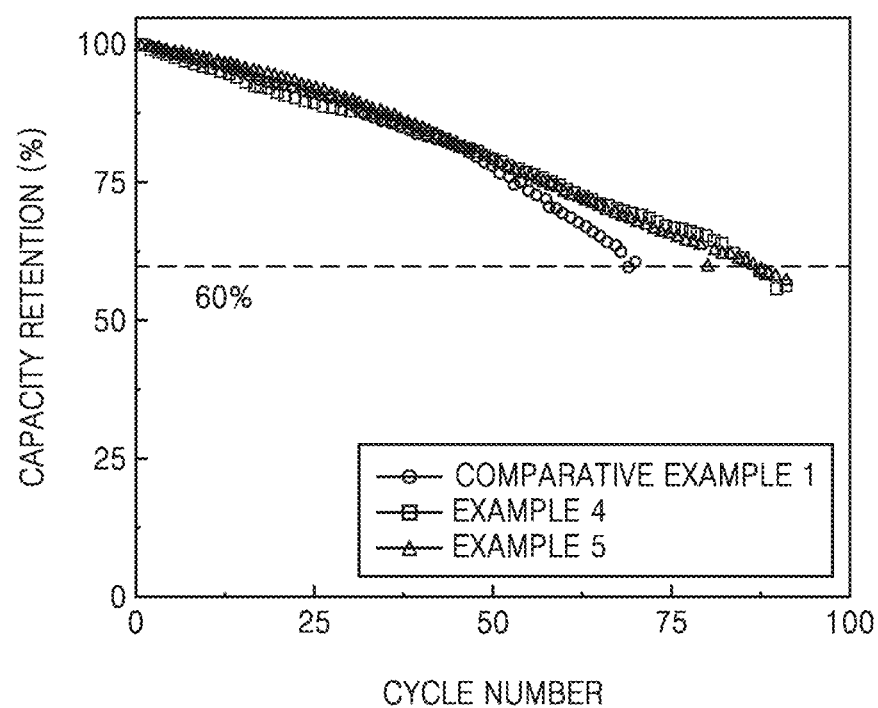
FIG. 10 is a graph of capacity retention (%) versus cycle number illustrating changes to the capacity of the lithium metal batteries of Examples 4 and 5 and Comparative Example 1 with respect to the number of cycles.

The changes of capacity retention of the lithium metal batteries of Examples 4 and 5 and Comparative Example 1 with respect to the number of cycles are shown in FIG. 10.

Referring to FIG. 10, based on a 60% capacity retention, it was found that the lithium metal battery of Comparative Example 1 exhibited about 70 cycles of lifespan characteristics, whereas the lithium metal batteries of Examples 4 and 5 exhibited about 95 cycles of excellent lifespan characteristics.

Evaluation Example 3: Electrolyte Performance

In order to evaluate the performance of the electrolytes used in Example 1 and Comparative Example 1, a three-electrode cell was manufactured. The working electrode of the three-electrode cell was platinum, and the counter electrode and reference electrode thereof were each lithium metal.

Linear Scanning Voltammogram (LSV)

The electrolytes of Example 1 and Comparative Example 1 were separately injected into the three-electrode cell. The current was measured as the voltage was gradually increased in 10 mV increments from 3.5 V to 6 V. The results thereof are shown in FIG. 11.

Figure 11:
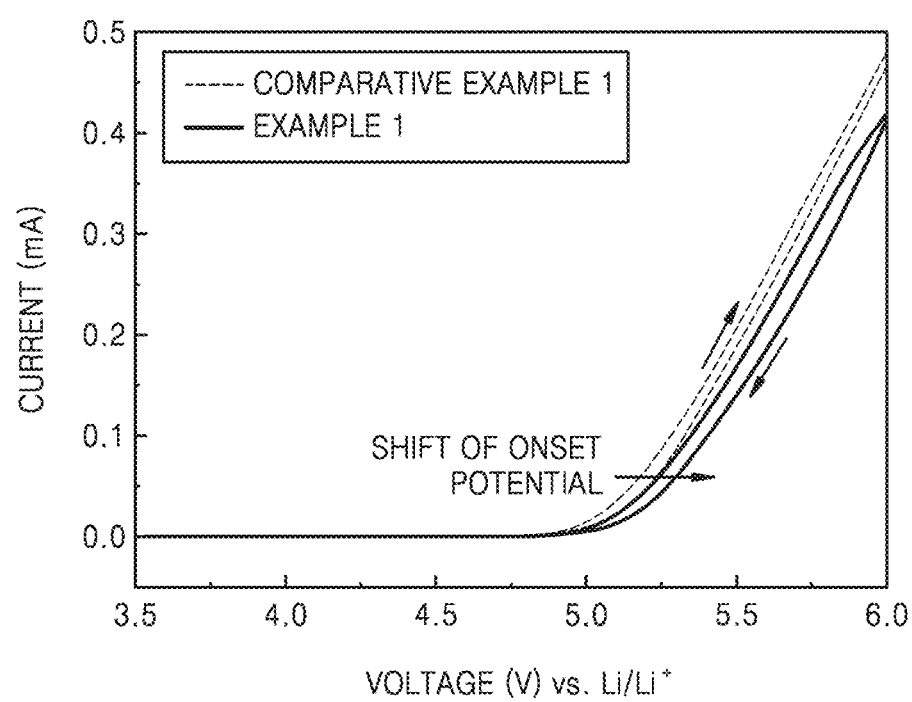
FIG. 11 is a graph of current (milliamperes, mA) versus potential (volts (V) vs. Li/Li+), illustrating the oxidation resistance of the electrolytes used in Example 1 and Comparative Example 1 over a gradual increase in voltage.

Referring to FIG. 11, it was found that the lithium metal battery of Example 1 had an onset potential that was about 0.25 V greater than the onset potential of Comparative Example 1, resulting in the observed oxidative decomposition of the electrolyte of Comparative Example 1. From this result, the electrolyte of Example 1 was found to have improved oxidation resistance, as compared with the electrolyte of Comparative Example 1. Therefore, the electrolyte of Example 1 may reduce the number of side reactions in a lithium metal battery, as compared with the electrolyte of Comparative Example 1.

Chronoamperometry

Figure 12:
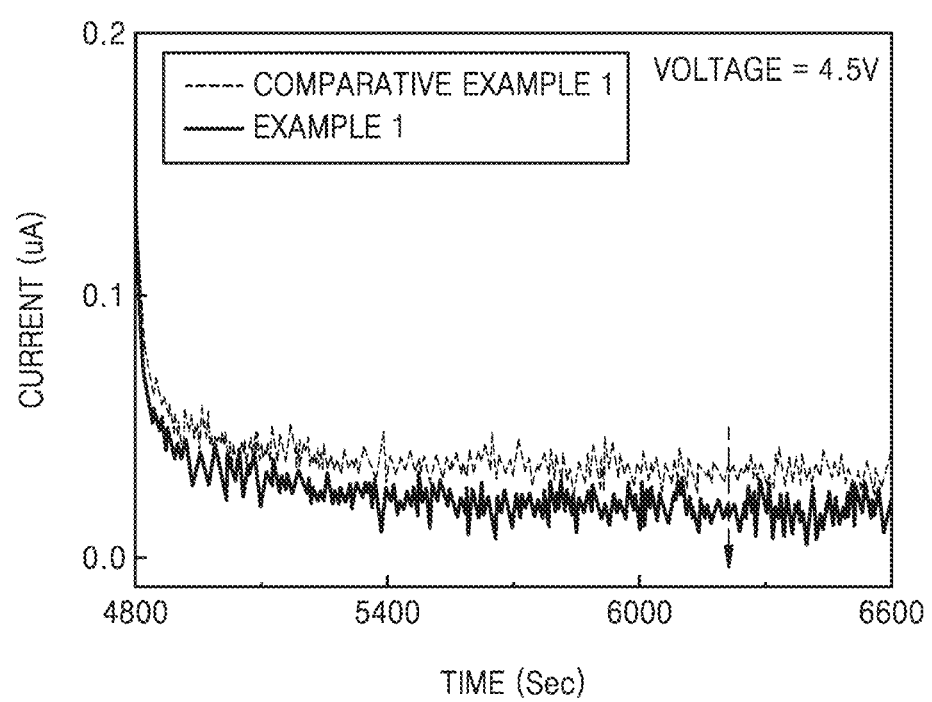
FIG. 12 is a graph of current (microamperes, µA) versus time (seconds, sec), illustrating the oxidation resistance of the electrolytes used in Example 1 and Comparative Example 1 with application of a constant voltage of 4.5 V.
Figure 13:
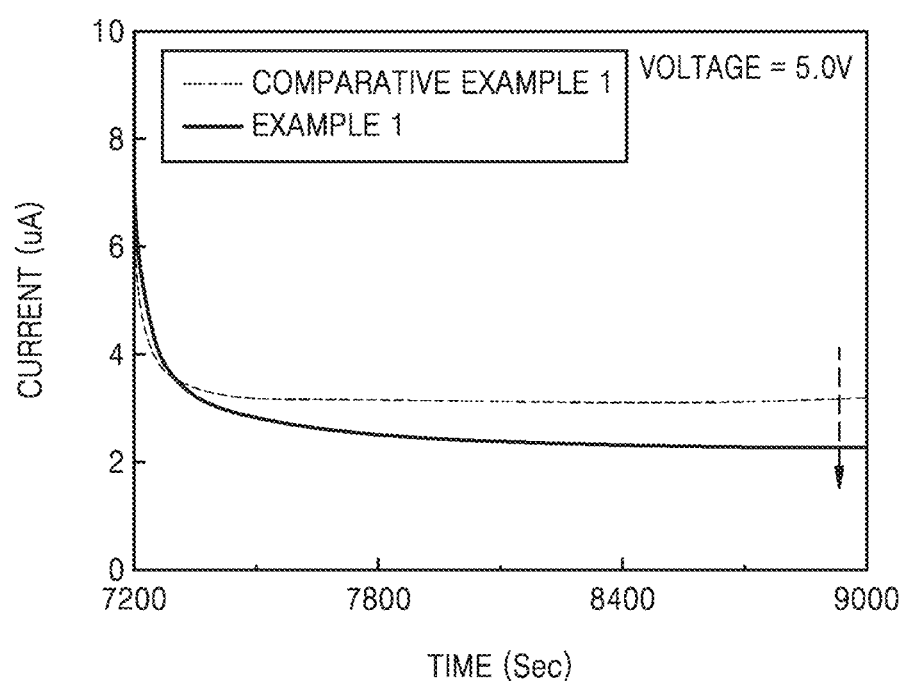
FIG. 13 is a graph of current (microamperes, µA) versus time seconds (sec), illustrating the oxidation resistance of the electrolytes used in Example 1 and Comparative Example 1 with application of a constant voltage of 5.0 V.

The electrolytes of Example 1 and Comparative Example 1 were separately injected into the three-electrode cell. A voltage of 4.5 V or 5.0 V was applied thereto, the current change was measured over time, and the results thereof are shown in FIG. 12 and FIG. 13, respectively. FIG. 12 shows the result when a voltage of 4.5 V was applied, and FIG. 13 shows the result when a voltage of 5.0 V was applied.

Referring to FIGS. 12 and 13, it was found that the electrolyte used in Example 1 had excellent high voltage stability, as compared with the electrolyte used in Comparative Example 1.

A lithium metal battery, according to an embodiment, may effectively suppress formation and growth of a dendrite on a surface of a lithium metal negative electrode, reduce interfacial resistance between the lithium metal negative electrode and an electrolyte, and improve mobility of lithium ions. Consequently, the lithium metal battery may have excellent lifespan characteristics.

It should be understood that embodiments described herein should be considered in a descriptive sense only and not for purposes of limitation. Descriptions of features or aspects within each embodiment should typically be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A lithium metal battery comprising:
a lithium metal negative electrode;
a positive electrode; and
an electrolyte between the lithium metal negative electrode and the positive electrode,
wherein the electrolyte comprises a nonaqueous organic solvent, a lithium salt, and an inorganic additive,
wherein the inorganic additive comprises an inorganic oxide,
wherein the inorganic oxide comprises at least one selected from a hydroxyl group and a $C_1$-$C_{10}$ alkyl group attached to a surface of the inorganic oxide, and
wherein the nonaqueous organic solvent is at least one selected from a glyme solvent and an ether solvent.

2. The lithium metal battery of claim 1, wherein the glyme solvent is at least one selected from 1,2-dimethoxyethane, diethylene glycol dimethyl ether, diethylene glycol diethyl ether, dimethylene glycol dimethyl ether, trimethylene glycol dimethyl ether, tetraethylene glycol dimethyl ether, polyethylene glycol dimethyl ether, triethylene glycol dimethyl ether, and triethylene glycol diethyl ether.

3. The lithium metal battery of claim 1, wherein the ether solvent is at least one selected from 1,1,2,2-tetrafluoroethyl-2,2,3,3-tetrafluoropropyl ether, tetrahydrofuran, 2-methyltetrahydrofuran, dimethyl ether, and dibutyl ether.

4. The lithium metal battery of claim 1, wherein the lithium salt is at least one selected from lithium bis(fluorosulfonyl) imide, lithium bis(trifluoromethanesulfonyl) imide, $LiPF_6$, $LiBF_4$, $LiAsF_6$, $LiClO_4$, $LiCsPF_6$, $LiNO_3$, $LiPO_2F_2$, LiBr, lithium bis(oxalato)borate, lithium difluoro(oxalate)borate, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and lithium trifluoromethanesulfonate.

5. The lithium metal battery of claim 1, wherein the lithium salt is soluble in the nonaqueous organic solvent, and the inorganic additive is insoluble in the nonaqueous organic solvent.

6. The lithium metal battery of claim 1, wherein the inorganic additive has attractive interactions with at least one selected from the nonaqueous organic solvent and the lithium salt.

7. The lithium metal battery of claim 6, wherein the attractive interactions comprise at least one selected from intermolecular forces, electrostatic interactions, π-interactions, Van der Waals forces, hydrogen bonds, and anion absorption.

8. The lithium metal battery of claim 1, wherein the inorganic oxide comprises at least one selected from a compound represented by Formula 1 and a complex thereof:

$$M_xO_y \qquad \text{Formula 1}$$

wherein, in Formula 1, $1 \leq x \leq 2$ and $1 \leq y \leq 4$, and
M is at least one selected from silicon, aluminum, magnesium, titanium, zirconium, zinc, and barium.

9. The lithium metal battery of claim 8, wherein the inorganic oxide comprises at least one selected from $SiO_2$, $TiO_2$, ZnO, $Al_2O_3$, $BaTiO_3$, and a complex thereof.

10. The lithium metal battery of claim 1, wherein an amount of the inorganic additive is in a range of about 0.1 part to about 20 parts by weight, based on 100 parts by weight of a total weight of the nonaqueous organic solvent and the lithium salt.

11. The lithium metal battery of claim 1, wherein the inorganic additive is in particle form and comprises primary particles having an average particle diameter of about 5 nanometers to about 100 nanometers or agglomerates of the primary particles having an average particle diameter of about 1 micrometer to about 100 micrometers.

12. The lithium metal battery of claim 1, wherein the lithium metal battery further comprises a protective film on the lithium metal negative electrode, wherein the protective film comprises a portion of the inorganic additive and a lithium metal layer surrounding the portion of the inorganic additive.

13. The lithium metal battery of claim 12, wherein a thickness of the protective film is in a range of about 1 micrometer to about 100 micrometers.

14. The lithium metal battery of claim 1, wherein the battery comprises at least one selected from a separator and a solid electrolyte disposed between the lithium metal negative electrode and the positive electrode.

15. An electrolyte for a lithium metal battery, the electrolyte comprising:
a nonaqueous organic solvent;
a lithium salt; and an inorganic additive, wherein the inorganic additive comprises an inorganic oxide, and wherein the inorganic oxide comprises at least one selected from a hydroxyl group and a $C_1$-$C_{10}$ alkyl group attached to a surface of the inorganic oxide, and wherein the nonaqueous organic solvent is at least one selected from a glyme solvent and an ether solvent.

16. The electrolyte of claim 15, wherein the glyme solvent comprises at least one selected from 1,2-dimethoxyethane, diethylene glycol dimethyl ether, diethylene glycol diethyl ether, dimethylene glycol dimethyl ether, trimethylene glycol dimethyl ether, tetraethylene glycol dimethyl ether, polyethylene glycol dimethyl ether, triethylene glycol dimethyl ether, and triethylene glycol diethyl ether.

17. The electrolyte of claim 15, wherein the ether solvent comprises at least one selected from 1,1,2,2-tetrafluoroethyl-2,2,3,3-tetrafluoropropyl ether, tetrahydrofuran, 2-methyltetrahydrofuran, dimethyl ether, and dibutyl ether.

18. The electrolyte of claim 15, wherein the lithium salt comprises at least one selected from lithium bis(fluorosulfonyl) imide, lithium bis(trifluoromethanesulfonyl) imide, $LiPF_6$, $LiBF_4$, $LiAsF_6$, $LiClO_4$, $LiCsPF_6$, $LiNO_3$, $LiPO_2F_2$, LiBr, lithium bis(oxalato)borate, lithium difluoro(oxalate) borate, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and lithium trifluoromethanesulfonate.

19. The electrolyte of claim 15, wherein the lithium salt is soluble in the nonaqueous organic solvent, and the inorganic additive is insoluble in the nonaqueous organic solvent.

20. The electrolyte of claim 15, wherein the inorganic oxide comprises at least one selected from a compound represented by Formula 1 and a complex thereof:

$$M_xO_z \qquad \text{Formula 1}$$

wherein, in Formula 1, $1 \leq x \leq 2$ and $1 \leq z \leq 4$, and
M is at least one selected from silicon, aluminum, magnesium, titanium, zirconium, zinc, and barium.

21. The electrolyte of claim 15, wherein an amount of the inorganic additive is about 0.1 part to about 20 parts by weight, based on 100 parts by weight of a total weight of the nonaqueous organic solvent and the lithium salt.

22. A method for producing a lithium metal battery, the method comprising:
providing an electrolyte comprising a nonaqueous organic solvent, a lithium salt, and an inorganic additive; and
combining a lithium metal negative electrode, a positive electrode, and the electrolyte to form the lithium metal battery, wherein the inorganic additive comprises an inorganic oxide, and the inorganic oxide comprises at least one selected from a hydroxyl group and a $C_1$-$C_{10}$ alkyl group attached to a surface of the inorganic oxide, and
wherein the nonaqueous organic solvent is at least one selected from a glyme solvent and an ether solvent.

23. The method of claim 22, wherein the lithium salt is dissolved in the nonaqueous organic solvent, and the inorganic additive is insoluble in the nonaqueous organic solvent.

24. The method of claim 22, wherein the inorganic oxide comprises at least one selected from compound represented by Formula 1 and a complex thereof:

$$M_xO_z \qquad \text{Formula 1}$$

wherein, in Formula 1, $1 \leq x \leq 2$ and $1 \leq z \leq 4$, and
M is at least one selected from silicon, aluminum, magnesium, titanium, zirconium, zinc, and barium.

25. The method of claim 22, wherein the inorganic oxide comprises at least one $SiO_2$, $TiO_2$, ZnO, $Al_2O_3$, $BaTiO_3$, and a complex thereof.

26. The method of claim 22, wherein an amount of the inorganic additive is about 0.1 parts to about 20 parts by weight, based on 100 parts by weight of a total weight of the nonaqueous organic solvent and the lithium salt.

* * * * *